Nov. 9, 1965     R. F. WOODCOCK     3,216,807
METHOD FOR MAKING FIBER OPTICAL DEVICES
Filed Nov. 3, 1960     2 Sheets-Sheet 1
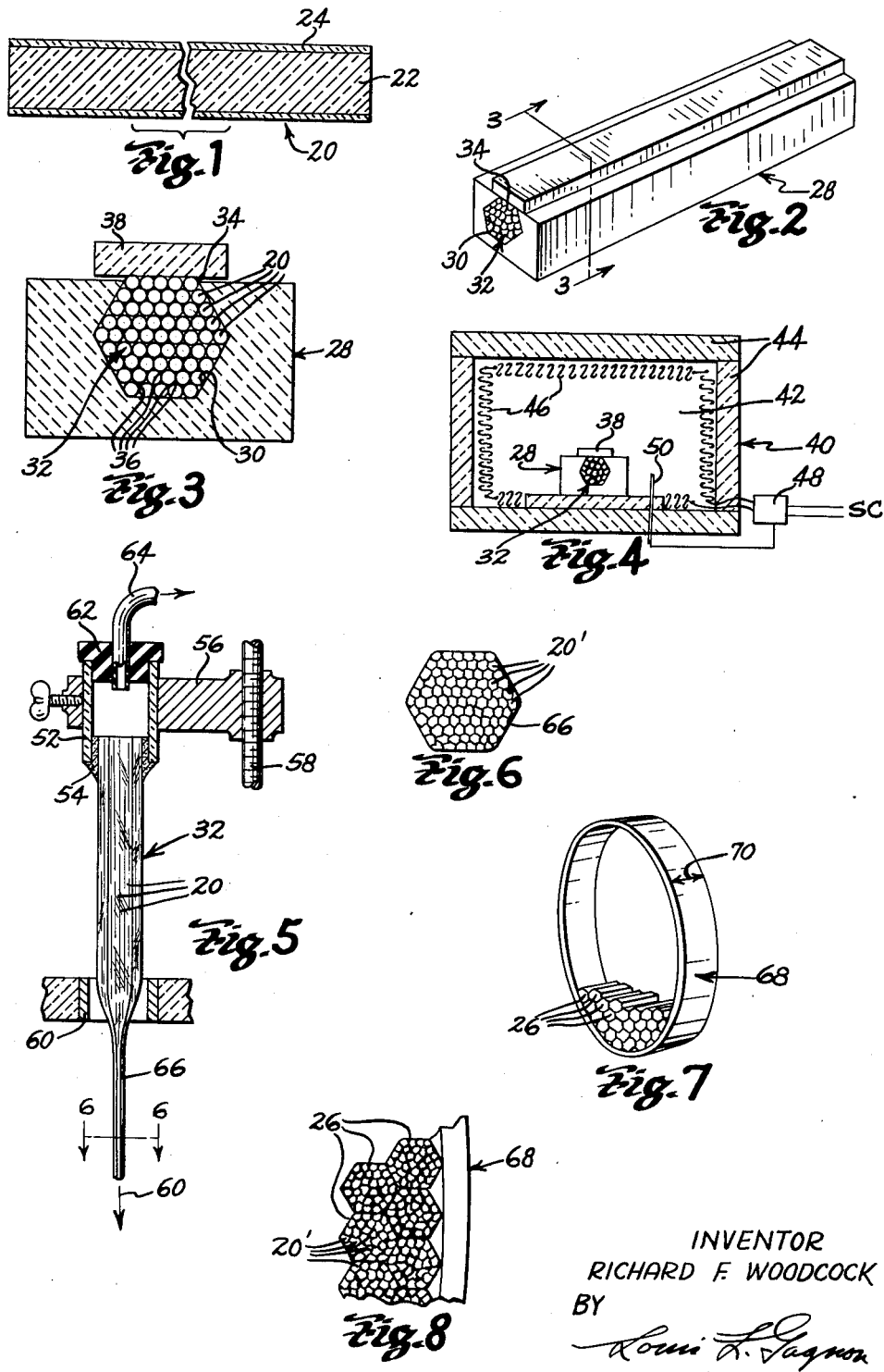
INVENTOR
RICHARD F. WOODCOCK
BY
Louis L. Gagnon
ATTORNEY Nov. 9, 1965  R. F. WOODCOCK  3,216,807
METHOD FOR MAKING FIBER OPTICAL DEVICES
Filed Nov. 3, 1960  2 Sheets-Sheet 2
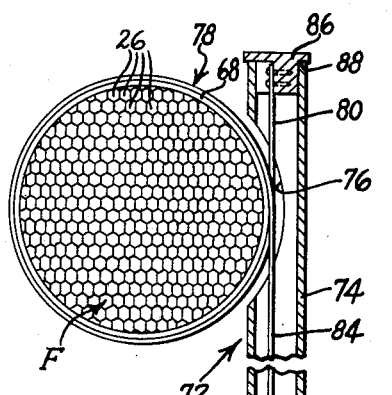
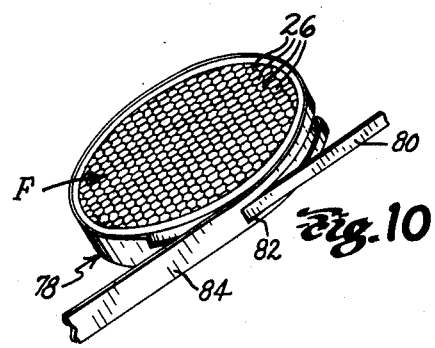
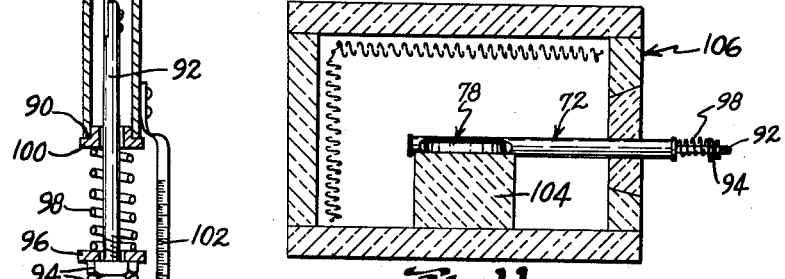
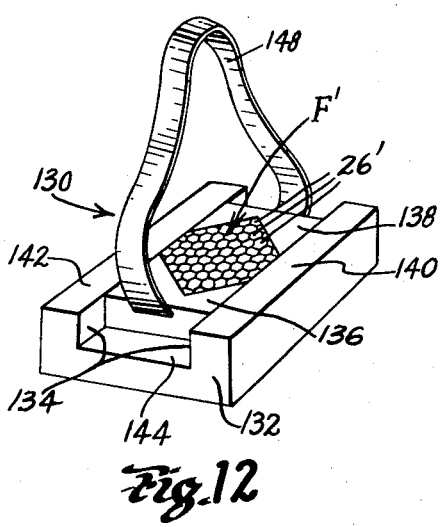
INVENTOR
RICHARD F. WOODCOCK
BY
*Louis L. Gagnon*
ATTORNEY

United States Patent Office 3,216,807
Patented Nov. 9, 1965

---

3,216,807
METHOD FOR MAKING FIBER OPTICAL DEVICES
Richard F. Woodcock, South Woodstock, Conn., assignor to American Optical Company, Southbridge, Mass., a voluntary association of Massachusetts
Filed Nov. 3, 1960, Ser. No. 66,988
2 Claims. (Cl. 65—4)

This invention relates to the making of fiber optical light-conducting devices and has particular reference to an improved method for fabricating relatively large light-conducting face plates or like articles from a multiplicity of individual light-conducting fiber-like elements.

Plate-like fiber optical devices of the type embodying a great number of individually light-insulated light-conducting fibers arranged in side-by-side adjoining relation with each other provide exceptionally efficient means for transferring light from one location to another. Furthermore, when such devices are constructed so as to have the opposite ends of each of the fibers thereof arranged in substantially identical geometrical patterns, they provide ideal means for receiving and transferring optical images and have been used to considerable advantage as face plates for cathode ray tubes or the like.

It is well known that in face plates of this type the resolution of images transferred thereby is dependent upon the cross-sectional size of the individual fiber elements which, for most practical purposes, must be hair-like in size or at least nearly so. This requirement for relatively small fiber elements has, heretofore, imposed serious fiber alignment problems in the fabrication of the face plates wherein literally millions of fiber elements are required to produce a face plate of only a very few inches in diameter.

In addition to the problems of fiber alignment, there is the requirement in cathode ray tube face plates or in articles of a similar nature that the ultimate product be vacuum-tight, able to withstand pressures exerted thereon as a result of vacuums or pressurized atmosphere within the tubes and indestructible by caustic atmospheres which might also exist within the tubes.

Along with the ever-increasing demand for larger face plates of the above-mentioned type wherein several million fiber-like elements are needed in the construction of a single article, fabrication problems have increased enormously particularly with relation to fiber alignment and the requirement for a hermetic seal between each and every one of the fibers. Moreover, the cost of fabrication, being relative to the difficulties encountered in construction has, in many instances, previous to this invention, rendered the use of fiber optical face plates economically prohibitive particularly when they are required to be of sizes greater than an inch or two in diameter.

The present invention overcomes the above-mentioned problems relating to the fabrication of fiber optical face plates and it is, accordingly, a principal object thereof to provide improved, simple and economical method and apparatus for constructing secure and highly optically efficient fiber optical face plates or like structures which are impervious to air or gases.

Another object is to simplify the construction of relatively large fiber face plates of the above character by the employment of a novel mosaic assembly technique which is simple to perform and adapted to assure a desired geometrical positioning of the fibers throughout the structure being formed thereof.

A further object is to provide simple and inexpensive apparatus for carrying out said assembly technique and for bringing about a hermetically sealed interfacial joinder between the elements of said assembly without appreciable distortion of said elements or deterioration of their initial optical qualities.

A still further object is to provide as a part of said apparatus, novel means for supporting a mosiac-like assembly of fiber optical elements and for applying a controlled compressing force thereto in such a manner as to urge said elements into firm side surface engaging relation during fusion thereof for purposes of bringing about a secure hermetic joinder between each of the elements.

Other objects and advantages of the invention will become apparent from the following description when taken in conjunction with the accompanying drawings in which:

FIG. 1 is a greatly enlarged longitudinal cross-sectional view of a preferred form of light-conducting fiber used in the fabrication of a fiber optical device of the type relating to the present invention;

FIG. 2 is a perspective view of apparatus used in the performance of an initial step of the invention in accordance with one aspect thereof;

FIG. 3 is an enlarged transverse cross-sectional view taken on line 3—3 of FIG. 2 looking in the direction indicated by the arrows;

FIGS. 4 and 5 are diagrammatic illustrations of apparatus for carrying out subsequent steps of the process of the invention;

FIG. 6 is a greatly enlarged cross-sectional view taken on line 6—6 of FIG. 5 looking in the direction indicated by the arrows;

FIG. 7 is a perspective view of a partial mosaic assembly of fiber optical elements used in the fabrication of a device of the type relating to the invention and which diagrammatically illustrates a method step to be performed subsequent to those illustrated in FIGS. 4 and 5;

FIG. 8 is a greatly enlarged fragmentary face view of the assembly shown in FIG. 7;

FIG. 9 is a plan view, partially in cross-section, of apparatus for supporting a completed assembly of elements of the type shown in FIG. 7 and wherein such a completed assembly is illustrated as being supported by said apparatus;

FIG. 10 is a fragmentary perspective view of a portion of said apparatus given to better illustrate its construction;

FIG. 11 is a diagrammatic illustration of means for carrying out a final step in the process of the invention using the apparatus shown in FIGS. 9 and 10; and FIG. 12 is a perspective view of an alternate form of apparatus for supporting an assembly of fiber optical elements during fusion thereof.

Referring more particularly to the drawings wherein like characters of reference designate like parts throughout the several views thereof, it will be seen that the invention relates broadly to method and apparatus for initially forming a plurality of fiber optical light-conducting elements each embodying a plurality of light-conducting fibers and being of similar predetermined cross-sectional shapes such as to permit said elements to be readily interfitted in side-by-side relation with each other, assembling said elements in mosiac fashion and fusing said element together into hermetically sealed relation without significant distortion thereof to form a composite hermetically sealed plate-like structure which will be referred to hereinafter as a face plate.

Fusion of the fiber optical elements is accomplished by applying carefully controlled lateral compressing forces upon the mosiac to bring about the desired joining together of the elements thereof with a minimum of heating time and with temperatures below those which would tend to cause appreciable deterioration of the optical properties of said elements.

In accordance with a preferred aspect of the portion of the process which relates to the forming of the above-mentioned fiber optical elements, there is shown in FIG. 1 a greatly enlarged longitudinal cross-section of an optical fiber 20 of the type preferably used in the fabrication of said elements.

The fiber 20 embodies a core section 22 formed of an optical glass having a relatively high index of refraction and an integral outer relatively thin cladding 24 of glass having a relatively low index of refraction. The cladding 24 which functions as light-insulating means prevents the effects of "crosstalk" or the interaction of light passing from one fiber to another when a plurality of fibers like the fiber 20 are assembled together in adjoining side-by-side relation as will be described hereinafter.

A typical fiber 20 might, for example, be constructed so as to have its core section 22 formed of optical flint glass having an index of refraction of approximately 1.75 with its cladding section 24 formed of a soda-lime glass or potash soda-lead glass having an index of refraction of approximately from 1.52 to 1.56. A cladding thickness of one-tenth the overall diameter of the fiber or less is generally considered to be suitable for efficient light-insulating purposes.

It is pointed out that in order to clearly illustrate the invention, the fibers 20 have been shown in the drawings as being relatively large in diameter while actually, for practical applications, they would be very small and when reduced to their final individual sizes in the finished product of the invention, they might be, for example, of such a cross-sectional size as to require one-quarter of a million or more to fill one square inch.

In forming the light-conducting elements 26 (see FIGS. 7 and 8) which are subsequently assembled together in mosaic fashion as will be described shortly, a plurality of fibers 20 which are preferably circular in cross-section and of such size as to be relatively easily handled, for example, .020 to .060 inches in diameter, are placed in a trough-like forming member 28 which is provided with an elongated fiber receiving channel 30 having a side wall configuration of substantially the ultimate cross-sectional shape desired of said elements 26. The forming member 28 is constructed of a refractory material selected to be of such character as to be geometrically stable and to inhibit adherence of the fibers thereto at glass fusing temperatures. Such a refractory material is disclosed in Patents No. 2,440,187 and No. 2,764,491. The member 28 is constructed to be of a size in accordance with the ultimate cross-sectional size and length desired of the assembly 32 of fibers 20 (see FIG. 5). As an example, a channel 30 approximately 12 inches long and having a hexagonal cross-sectional shape whose greatest width is approximately 1 inch will produce an assembly 32 (see FIG. 5) of a convenient and easily workable size and shape which can be readily heated and drawn to form a structure from which the elements 26 are subsequently cut as will be described in detail hereinafter.

It is pointed out that the illustrated hexagonal shape is preferred in the fabrication of the assembly 32 so as to permit the forming of elements 26 therefrom of substantially the same shape and which can be quickly and easily subsequently interfitted in side-by-side mosaic fashion as shown in FIGS. 7 and 8. Nevertheless, it should be understood that assemblies of other rectilinear cross-sectional shapes such as triangular, square or the like, may be used to form similarly shaped fiber optical elements of the type referred to herein as 26. It will become apparent hereinafter that the ultimate shapes of the finally formed elements 26 are determined by and result from the particular configuration of the assembly 32.

The fibers 20 are placed in the channel 30 in such manner as to lie straight and lengthwise therein and are inserted through the top opening 34 thereof in groups or one at a time. Being circular in cross section, the fibers 20 will tend to assume a compact substantially parallel interfitting relationship with each other. In order to assure such a relationship, the member 28 may be vibrated in one or more directions during or after the loading thereof or it may be tapped relatively lightly but sharply occasionally during said loading to cause the fibers 20 to settle into place and thereby provide interstices 36 between each of the fibers which interstices extend from end to end throughout the length of the resultant assembly 32 thereof.

As mentioned above, circular fibers are preferred in the forming of the assembly 32 since they inherently tend to assume a substantially parallel side-by-side relationship when placed in the member 28 and thereby provide the resultant assembly 32 with substantially identically geometrically patterned opposite end faces which, as it will become apparent hereinafter, is of importance for the reason that the image resolving power of the finally formed face plate of the invention is, for the most part, dependent upon the image resolving power of each of the individual elements 26 which are subsequently formed from the assembly 32.

When referring to the term "degree of image resolving power" herein, it is meant the degree of accuracy and clarity with which a fiber optical assembly is capable of receiving and transferring an optical image. That is, the degree of exactness and clarity that exists between the original image and the same image as it appears after having been transferred through the fiber optical face plate of this invention.

A further and also important reason for the selection of circular fibers 20 in the fabrication of the assembly 32 is the fact that the interstices 36 between each and every one of the fibers, when preserved during the fusing together of the fibers 20 as will be described shortly, provide air spaces through which gases may be evacuated during the drawing of the assembly 32 as shown in FIG. 5.

Once the channel 30 of the member 28 is completely filled with the fibers 20 as shown in FIG. 3, a refractory block 38 is placed upon the uppermost layer of fibers 20 which functions, by reason of its weight, to compress the fiber assembly 32 slightly during subsequent fusion thereof. It is pointed out that the relative cross-sectional sizes of the channel 30 and the individual fibers 20 are preselected so as to cause the initial assembly to protrude outwardly of the top opening 34 of the channel 30 only a small fraction of an inch so that with the fibers 20 heat softened for fusion the compressing effect of the block 38 upon settling to seat upon the upper surface of the member 28 will be only sufficient to compact the fibers enough for good fusion between their adjoining surfaces without significantly distorting the fibers or causing a closing off of the interstices 36 therebetween.

The fusing together of the assembly 32 of fibers 20 is accomplished by placing the member 28 in a conventional glass heating furnace 40 as illustrated diagrammatically in FIG. 4. In the usual manner of construction the furnace 40 embodies a heating chamber 42 formed by an enclosure of heat insulating wall parts 44 and having electrical heating elements 46 connected through a conventional control unit 48 to a suitable source of current which is indicated in the drawing as SC. By means of a heat sensing element 50 which is electrically interconnected with the unit 48, the temperature in the chamber 42 is maintained at a predetermined level during the fusing operation. It is pointed out that the furnace 40 construction is entirely conventional and may be of any type well known to the art.

The temperatures and time cycle used for fusing the fibers 20 are carefully controlled to provide a secure but light fusion of the adjoining areas of the fibers 20 so as to produce a minimum of distortion thereof and to preserve the porous nature of the assembly 32 which is the result of the above-mentioned interstices 36 extending from end-to-end therethrough. For fibers 20 formed of glasses of the above-given examples, a temperature in the chamber 42 of approximately 1040° F. for a time cycle of approximately one hour will produce good results, it being understood that the temperatures and cycles of heating are determined in accordance with the characteristics of the particular glasses used in the construction of the fibers 20 and, further, to some extent in accordance wtih the size of the assembly 38 being formed.

After having lightly fused the fibers 20 together to form an integral assembly 32, said assembly is cooled at least to a temperature such as to permit handling thereof and one of its ends is potted in a tubular member 52 (see FIG. 5), by means of a suitable cement or sealing agent 54. A suitable sealing agent might be, for example, an inorganic silicate base cement which will withstand relatively high temperatures. The tubular member 52 may be formed of glass, metal or any material capable of withstanding the heating effect which might be imposed thereon during the subsequent drawing operation to be described shortly.

With the assembly 32 of fibers potted in the tubular member 52 so as to provide a substantially air tight seal between the tubular member 52 and the assembly 32, the said assembly is suspended vertically in fiber drawing apparatus as shown diagrammatically in FIG. 5 by clamping the tubular member 52 in a supporting arm 56 of a part of the drawing apparatus. In the usual manner of drawing a glass assembly down to a reduced cross-sectional size, the supporting arm is lowered at a precontrolled rate by means of a rotating lead screw 58 or any other suitable drive means toward a fixed annular heating element 60 placed in coaxial relation with the fiber assembly 32 so as to direct the assembly 32 into and through the heating element 60. Simultaneously with the lowering of the assembly 32, its lowermost heat softened end is gripped and drawn without twisting axially away from the heating element as indicated by the arrow 60 at a controlled rate greater than that of the lowering of the fiber assembly 32 in accordance with the amount of reduction in size desired of the assembly 32 as a result of the drawing.

The heating element 60 is preferably in the form of a split O-ring or band of a suitable well-known electrical resistance material having a diameter somewhat greater than the largest cross-sectional dimension of the assembly 32. The element 60 is electrically connected in series at its split adjacent ends with a suitable source of current through a conventional heat control unit adapted to regulate its temperature in accordance with the heating effect desired upon the adjacent portion of the fiber assembly 32. A heat control arrangement such as shown in association with the furnace 40 in FIG. 4 might be used for this purpose.

Since, during the heating and drawing an assembly of fibers such as shown in FIG. 5, gases are usually expelled from the glasses thereof, a vacuum system is attached to the uppermost end of the tubular member 52 to continuously draw these gases and/or air out from between the fibers through the interstices 36 therebetween during the drawing operation of FIG. 5.

The vacuum system embodies simply a stopper 62 or any other suitable means for sealing the adjacent end of the tubular member 52 and through which a vacuum line 64 extends into the interior of the tubular member 52.

In addition to the removal of air or gases from between the fibers 20 of the assembly 32 which assures a bubble-free fused joinder of the fibers when drawn, the vacuum is controlled to be of such force as to compact the fibers 20 by tending to draw them tightly together as they become heat softened in the area of the heating element 60.

In accordance with the invention, the assembly 32 is drawn down to a size of approximately .040 to .060 inch in diameter to form an elongated multi-fiber structure 66 (see FIG. 5), from which the above-mentioned light-conducting elements 26 are formed by cutting the structure 66 to predetermined lengths.

It is pointed out that in referring to the structure 66 as being a "multifiber structure," it is meant that it contains a plurality of individual very small light-conducting channels which result from the simultaneous drawing down of the many fibers 20 of the assembly 32. The light-conducting channels, which are actually the reduced fibers 20, will as in the case of all fiber drawing operations inherently each retain substantially the same proportions of core to cladding thicknesses as the initial fibers 20.

Furthermore, the structure 66 itself will retain substantially the outer contour shape of the assembly 32 and be hexagonal, for example, as illustrated in FIG. 6 when a proper drawing temperature selected in accordance with the nature of the fiber glasses and further in accordance with the rate at which the assembly 32 is lowered through the heating element 60. For example, with an assembly 32 of fibers formed of glasses of the type referred to hereinabove, a drawing temperature of approximately 1420° F. has been found to produce satisfactory results when the assembly is lowered at a rate of approximately 2 inches per hour through the heating element 60.

It is pointed out that, by the practice of the above drawing operation, the structure 66 itself results in a secure, positively air-tight fused integral assembly containing a plurality of fiber light-conducting paths which are indicated in the drawings by the reference numeral 20'. Furthermore, these light-conducting paths 20' are substantially parallel to each other throughout the length of the structure 66 so as to be substantially identically geometrically patterned at practically any cross-section of said structure 66.

The structure 66 is normally cooled by the surrounding atmosphere after passing through the heating element 60. However, if annealing of the structure is required, it might be passed immediately from the heating element 60 through another similar element (not shown) which is adapted to surround the structure 66 with a proper annealing temperature prior to its entering the surrounding atmosphere. The fiber light-conducting elements 26 are formed from the structure 66 by cutting the structure 66 transversely into lengths controlled in accordance with the thickness desired of the end product or face plate of the invention.

It can be seen that the elements 26, each embodying the above-mentioned physical characteristics of the structure 66, are individually positively air-tight throughout their length and have substantially identically geometrically patterned opposite end faces. Furthermore, the light-conducting paths 20' are inherently substantially axially parallel to the outer edges of the elements 26 so that when said elements are assembled together in side-by-side relation, their respective adjoining paths 20' will automatically become substantially parallel to each other throughout the assembly.

In the fabrication of the resultant end product or face plate F of the invention (see FIGS. 9 and 10) the elements 26 are assembled in mosaic fashion within a relatively thin walled glass tube 68 having a diameter chosen to produce the size desired of the final face plate F and of a length 70 approximately equal to the thickness desired of the face plate F.

It is pointed out that the tube 68 may be several inches in diameter and only a fraction of an inch, more or less, in length 70 and is preferably selected to be of a glass composition having characteristics similar to those of the core glasses of the above described fibers 20.

Being hexagonal in shape, the elements 26 may be easily assembled in the tube 68 and will inherently fall into place to form the mosaic shown in FIG. 7 and which is illustrated more clearly by the greatly enlarged fragmentary view of FIG. 8. The loading of the tube 68 with elements 26 may be accomplished by any method which is most convenient to one making the mosaic assembly. That is, for example, a flat plate may be placed across one end of the tube to locate the ends of the elements 26 flush with the end of the tube 68 and with the tube and plate together held at a slight tilt relative to the horizontal, the elements may be loaded one at a time or in groups and shaken into place if necessary.

After the elements 26 are packed rather tightly in the tube 68, the entire assembly is placed in a supporting member 72 (see FIG. 9) in preparation for the final step of fusion wherein the resultant mosaic is formed into an integral composite airtight face plate F.

The supporting member 72 comprises a tubular main body part 74 which is cut away at 76 to receive the opposite ends of a wrap-around metallic band 78 which holds the assembly of the elements 26 and tube 68 by being passed circumferentially around and tightly against the outer side wall of the tube 68. In order to permit this wrap-around feature of the band 78, its end section 80 is somewhat reduced in width and is passed through a slotted area 82 (see FIG. 10) in the portion of the band which leads to its opposite end section 84. The terminal end of the section 80 of the band 78 is riveted or otherwise secured to a stop member 86 which extends partially into the body part 74 and has a portion thereof overlying one end 88 of said body part 74 so as to be immovable in a direction toward the opposite end 90 of the body part 74 and thereby provide an anchor for the end section 80 of the band 78. The opposite end section 84 of the band 78 is similarly riveted or otherwise secured to one end of a longitudinally adjustable rod 92 extending substantially axially into the body part 74. The rod 92 is threaded at its opposite end and provided with adjustable stop nuts 94 which abut a washer member that is urged against said stop nuts by one end of a spring 98 under compression and which surrounds the rod 92. The opposite end of the spring 98 rests against a stop member 100 similar to the member 86 which abuts the end 90 of the body part 74. The tension of the spring 98 exerts a pulling force on the end section 84 of the band 78 which, with its opposite end section 80 being anchored, tightens the band about the assembly of fiber elements 26 and tube 68 and produces a squeezing action thereon.

The amount of tension on the band 78, that is, the force of the squeezing action is adjusted by threading the nuts 94 back or forth along the rod 92 as required. An indication of the amount of tension applied to the band 78 may be had by observing the registration of the washer 96 or nuts 94 relative to a scale 102 of suitable calibration which is fixed to the body 74 of the member 72. It will become apparent hereinafter that during the fusing of the mosaic assembly, an indication of the extent of contraction of said assembly can also be had by observing the extent of movement of the washer 96 or nuts 94 relative to certain markings on the scale 102.

With the mosaic assembly of the elements 26 positioned in the supporting member 72, as just described, it is rested with one side or face thereof against the flat surface of a refractory block 104 within the heating chamber of a glass fusing furnace 106 (FIG. 11). The block 104 is constructed of a material similar to that used in the forming member 28 which does not have an affinity for heat softened glass.

In placing the member 72 in the furnace, its end having the scale 102 thereon is preferably allowed to protrude outwardly of the furnace as shown diagrammatically in FIG. 11. In this way, one can readily observe the amount of contraction of the fiber mosaic assembly which takes place during the fusing operation and/or make adjustments to increase or decrease the tension on the band 78 at any time during the fusing cycle if desired. It should be understood, however, that the entire structure of the supporting member, once having been preset for tension, can be completely contained within the furnace 106 and by means of a window in the furnace one might observe the relative positions of the washer 96 and specific markings on the scale. The furnace 106 is conventional and is operated in a manner similar to the above-described furnace 40 shown in FIG. 4.

It is pointed out that the temperatures and time cycles used in fusing the elements 26 together are selected in accordance with the nature of the particular glasses used in the construction of the fiber elements 26 and further in accordance with the compressing force applied thereto through the use of the member 72. The said compressing force is controlled to produce a perfect hermetically sealed fused joinder between each and every one of the elements 26 at a relatively low fusing temperature and without causing excessive distortion of the elements 26 or otherwise deteriorating their optical efficiencies. As an example, a fusing temperature of approximately from 1050° F. to 1150° F. for a time cycle of approximately 1 to 4 hours will produce satisfactory results when using fiber elements 26 formed of the above-mentioned combination of optical flint and crown glasses. A compressing force of approximately 10 or more lbs./sq. inch will produce the desired result of a secure hermetically sealed joinder between said elements. Higher pressures will permit the use of lower temperatures and/or shorter fusing cycles.

After fusion of the elements 26 and proper annealing thereof, for example, at temperatures gradually reduced from approximately 900° F. to 775° F. over a period of 1½ to 2 hours, the supporting member 72 is removed from the furnace 106 and the face plate F is released from the band 78.

The completed face plate F may then be cut to a different peripheral contour shape if desired and optically finished on one or both sides by known methods of grinding and polishing. One or both of the opposite sides or faces of the face plate F may be finished flat or meniscus in shape in accordance with the particular requirements of the cathode ray tube or other device in conjunction with which they are to be used.

In all cases, however, the smallest individual fiber-like elements or light-conducting channels 20' will have their opposite end faces substantially perfectly identically geometrically patterned at opposite sides of the face plate F so as to provide means for transferring optical images with exceptional definition. Moreover, in view of the fact that the light-conducting channels 20' are minute in size as a result of the drawing operation of FIG. 5, the face plate F will have exceptional image resolving power as well as being sturdy in its structure and vacuum or air-tight.

In FIG. 12 there is shown a modification of the invention which embodies apparatus which may be used in lieu of the supporting member 72 of FIG. 9 for fusing together either the fiber optical elements 26 or 108. For purposes of illustration, the device 130 is shown as being employed to form a face plate F' which is hexagonal in shape. It will, however, become apparent that the device 130 may be modified to render it applicable to the forming of face plates of various other shapes including the circular shapes shown and described above.

It is pointed out that the effect of squeezing or applying compressing forces to the mosaics in all cases discussed herein, avoids the danger of leaks or porosities from forming between the elements 26 or 108 and allows fusion to take place at lower temperatures than would otherwise be required. This avoids the well-known adverse effects of overheating glass articles being fused together.

It is apparent from the foregoing that the supporting member 72 will function most effectively in the forming of face plates such as F which are circular as shown or at least generally of a circular peripheral contour while they may be used with a lesser degree of effectiveness in the forming of rectilinear face plates. The device of FIG. 12 will, however, provide means for more efficiently forming rectilinear face plates.

The device 130 which is shown in its simplest form for purposes of illustration embodies a main body section 132 which is formed of a refractory material preferably of the type described hereinabove with relation of the members 28 (FIGS. 2 and 3) and 104 (FIG. 11). The section 132 is provided with a rectangularly shaped recessed guideway 134 in which a pair of refractory blocks 136 and 138 are fitted so as to be slidable toward and away from each other in the guideway 134. The blocks 136 and 138 are preferably formed of the same type of refractory material as that of the body section 132 and are of a thickness approximately equal to that of the guideway 134 so as to be substantially flush relation with the uppermost surface areas 140 and 142 of the body section when seated against the base 144 of the guideway 134. The base 144 of the guideway 134 is lined preferably with a thin sheet of mica or any other similarly characterized material which functions to render the blocks 136 and 138 more easily slidable along the guideway 134.

The facing end surfaces of the blocks 136 and 138 are shaped in accordance with the ultimate outer contour shape desired of the face plate F' to be formed therein. As shown in FIG. 12 the blocks 136 and 138 are shaped so as to form together with the sidewalls of the guideway 134 a hexagonal opening therebetween when properly spaced apart.

In operation, the area between the facing end surfaces of the blocks 136 and 138 is filled with fiber optical elements 26'. The size or type of fiber optical elements used in conjunction with the device 130 is immaterial as to its function or operation and, therefore, for purposes of illustration, the fiber elements 26' which are shown in FIG. 12 will be considered to be of the type illustrated and referred to as 26 in FIGS. 7 and 8.

The elements 26' are inserted endwise into the area between the blocks 136 and 138 and are interfitted in side-by-side relation with each other in mosaic fashion. The number of elements 26' which are so placed in the device 130 is controlled to be such as to cause the blocks 136 and 138 to be initially spaced from each other a distance in accordance with the amount of compression desired to be effected upon the mosaic so that when the fiber assembly is fully compressed during the subsequent fusing operation it will take a substantially true hexagonal shape. A spring clamp 148 is fitted over the outermost opposing side edges of the blocks 136 and 138 in the manner shown in FIG. 12 to urge the blocks 136 and 138 each in a direction toward the other so as to apply a compressing force upon the fiber optical mosaic of an amount controlled in accordance with the tension characteristics of the spring 148.

Fusion of the fiber elements 26' is accomplished by placing the entire structure which is shown in FIG. 12 in an oven or furnace of the type shown in FIGS. 4 or 11 wherein, when the elements 26' are heated to their softening point, a gradual compression of the mosaic structure thereof will take place through the action of the spring 148 upon the blocks 136 and 138.

The spring is selected to be of such tension as to apply a force sufficient only to produce a secure and hermetically sealed joinder between the elements 26' without causing excessive distortion thereof or in any way deteriorating their initial optical properties.

It is pointed out that face plates of shapes other than hexagonal as shown in FIG. 12 may be formed with the device of FIG. 12 simply by altering the shape of the facing end parts of the blocks 136 and 138 in accordance with the particular contour shape desired of the face plate to be formed therebetween. Furthermore, the spring 148 may be replaced by other types of more elaborate tensioning means which might be adjustable and incorporate a scale or the like as in the case of the members 72 and 128 to indicate tensions applied to the face plates and also to indicate the extent of contraction taking place during their fusion.

From the foregoing, it can be seen that improved, simple and economical means and method have been provided for accomplishing all of the objects and advantages of the invention. However, it should be readily apparent that many changes in the details of construction and arrangement of parts or steps in the process may be made without departing from the spirit of the invention as expressed in the accompanying claims and the invention is not to be limited to the exact matters shown and described as only the preferred matters have been given by way of illustration.

Having described my invention, I claim:

1. The method of making a fused energy-conducting face plate having energy receiving and emitting opposite faces of relatively large surface area formed of corresponding opposite ends of a great number of relatively thin individually clad energy-conducting fiber elements fused to one another in hermetically sealed side-by-side relationship and adapted to individually conduct energy therethrough by the function of internal reflection, said method comprising the steps of bundling a plurality of relatively long individually clad rods of heat softenable and fusible energy-conducting material in side-by-side prearranged geometrical relation with one another, said bundle having an outer polygonal cross-sectional shape, heating said bundle to a temperature sufficient to soften and fuse respective individual rods one to the other, drawing all of said rods longitudinally as a unit into a single rod of greatly reduced cross-section having substantially the same cross-sectional shape as that of said bundle and containing fused together longitudinal energy-conducting channels representative of each said individual rods, dividing said single rod into relatively short lengths approximately equal to the thickness desired of said plate, assembling said lengths in mated side-by-side relationship and in sufficient number to form by the arrangement of corresponding opposite ends thereof said faces of relatively large surface area, heating the assembly to a temperature sufficient to fuse adjoining sides of said lengths one to the other and simultaneously applying a laterally directed compressing force to said assembly substantially uniformly along its thickness between respective faces thereof in an amount sufficient to hermetically seal respective component parts of said assembly together to render the resultant plate structure as a whole substantially impervious to air and gases.

2. The method of making a fused energy-conducting face plate having energy receiving and emitting opposite end faces of relatively large surface area formed of corresponding opposite ends of a number of multi-channeled energy-conducting structures each having an outer polygonal cross-sectional configuration and formed of a multiplicity of individually clad energy-conducting fiber elements fused together in side-by-side prearranged geometrical relationship, said multi-channeled structures each being of a length approximately equal to the thickness desired between said opposite faces of said plate, said method comprising bundling said multi-channeled structures together in side-by-side relation with each other in such manner that the spacing therebetween is substantially no greater than that between their respective individual fiber elements, heating the bundle to a temperature sufficient to fuse together adjoining side surfaces of said structures and applying a radially inwardly directed compressing force substantially uniformly over substantially the entire length of said bundle to hermetically seal respective components of the assembly to each other and render the resultant plate structure as a whole substantially impervious to air and gases.

(References on following page)

References Cited by the Examiner

UNITED STATES PATENTS

| | | | |
|---|---|---|---|
| 631,447 | 8/99 | Taft | 100—244 |
| 1,344,261 | 6/20 | Chermak | 100—244 |
| 1,758,798 | 5/30 | Lopez | 100—244 |
| 1,899,146 | 2/33 | Gross | 65—4 |
| 2,087,328 | 7/37 | Mitchnick | 24—279 |
| 2,290,960 | 7/42 | Hallerberg | 24—279 |
| 2,608,722 | 9/52 | Stuetzer | 19—48 |
| 2,619,438 | 11/52 | Varian et al. | |
| 2,652,660 | 9/53 | Kurz | 65—45 |
| 2,752,731 | 7/56 | Altosaar | 65—23 |
| 2,992,516 | 7/61 | Norton | 65—3 |
| 2,992,586 | 7/61 | Upton | 88—1 |
| 2,992,956 | 7/61 | Bazinet | 154—90 |
| 3,004,368 | 10/61 | Hicks | 65—4 |

OTHER REFERENCES

"Optica Acta," vol. 7, No. 3, July 1960, pages 201–217, article entitled "Electro-Optical Systems Using Fibre Optics," by N. S. Kapany.

DONALL H. SYLVESTER, *Primary Examiner.*

ARTHUR P. KENT, WILLIAM B. KNIGHT,
*Examiners.*